Figure 1:
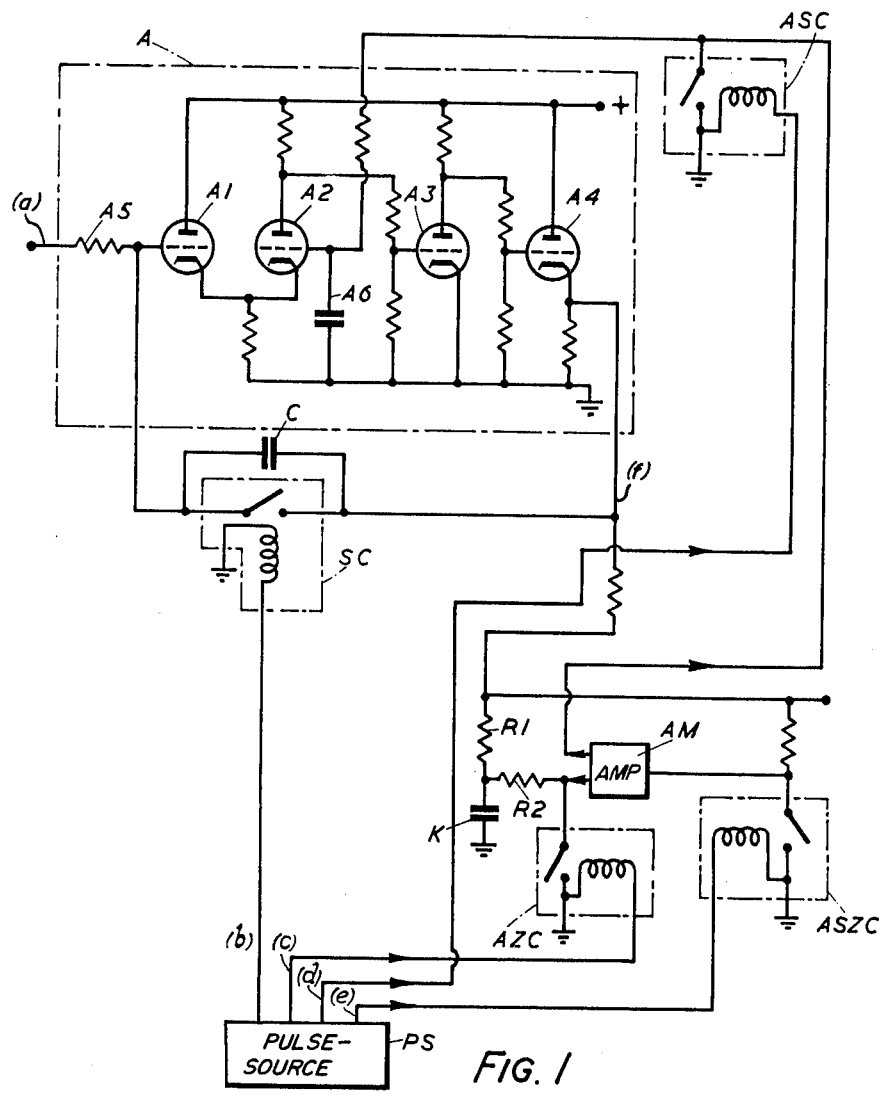

United States Patent Office 3,200,338
Patented Aug. 10, 1965

3,200,338
AUTOMATIC CORRECTION ARRANGEMENTS
FOR PERIODIC INTEGRATORS
Alfred Brian Edwin Ellis, Widford, England, assignor to
The Marconi Company Limited, a British company
Filed July 17, 1961, Ser. No. 124,494
Claims priority, application Great Britain, Aug. 10, 1960,
27,758/60
6 Claims. (Cl. 328—35)

This invention relates to automatic correction arrangements for periodic integrators, by which term is meant apparatus adapted to translate periodically recurring pulses into periodically recurring saw-tooth waves of amplitude substantially proportional to the amplitude of the said pulses.

There are a number of cases in which periodic integrators are required. Thus, for example, in certain radar installations for displaying the speed and direction of movement of targets, signals derived from received echoes from a target are fed into a computer which produces therefrom two output square pulse periodic waveforms, one of amplitude proportional to the target's component velocity in one direction (e.g. North or South) and the other of amplitude proportional to the target's component velocity in the perpendicular direction (e.g. East or West). Periodic integrators are used to translate these periodic pulse waveforms into periodic saw-tooth waveforms of corresponding amplitudes. By applying the two resultant saw-tooth waveforms to the two mutually perpendicular deflection systems of a cathode ray display tube there is obtained a display in the form of a line, the direction of which is representative of the direction of movement of the target and the length of which is representative of the speed of said movement.

It is important that a periodic integrator for use for a purpose such as that just described shall always produce a saw tooth, the slope and amplitude of which, and the initial value of which (i.e. value from which the sloping face of the saw tooth starts) shall not vary with "drift" and similar variations which may occur in the integrator and have nothing to do with the input pulse waveform. Because of this necessity it is customary to provide such an integrator with automatic slope correction (ASC) for correcting drift of slope of the sawtooth and usually also with automatic zero correction (AZC) for correcting drift of the zero of the sawtooth. In one known form of periodic integrator comprising a direct coupled amplifier of which the first stage consists of a so-called cathode-coupled valve pair with the input applied to the grid of one of the valves through a resistance and a storage condenser between the grid of the other valve and earth, and wherein a feed-back condenser, which is periodically short-circuited to effect clamping, is connected between the output and the input of the amplifier, ASC is effected by reducing the input to zero during one of the periods when the clamp is "open," sampling the output produced in this period so as to derive therefrom an ASC control signal dependent upon any saw-tooth slope drift which may then be present, and applying the derived control signal to correct for the said drift, e.g. by applying it to the grid of the valve to which the storage condenser is connected. The lack of the undesirable integration encountered may be reviewed in the publication entitled "Waveforms," McGraw-Hill, vol. 19, of the Radiation Laboratory Series, section 18.7, particularly the paragraph on Miller integrators, beginning on page 664. This type of arrangement leaves much to be desired. Because the input has to be reduced to zero while the output is being sampled, the sampling periods have to be relatively widely spaced in time, otherwise the loss of input signal would be intolerable. Since the sampling periods are well spaced in time, uncorrected drift of slope can, and often does, occur between them. Also, of course, there is the defect of loss of input signal every time sampling occurs, since the input is reduced to zero during each such period. The main object of the present invention is to avoid these defects and to provide an improved degree of ASC without loss of input signal.

According to this invention a periodic integrator comprises an amplifier; means for applying a periodic pulsed waveform to the input of said amplifier; means in said amplifier for transforming each input pulse into a sawtooth output wave of amplitude dependent on the input pulse amplitude; periodically actuated clamp means between the output and the input of said amplifier, said clamp means being actuated at the input pulse frequency but having the duration of each period of "opening" longer than the duration of an input pulse so that the clamp is open during each input pulse and also during part of the space between two successive input pulses; means for periodically sampling the amplifier output at the input pulse frequency during periods each of which occurs during that part of a space between successive input pulses when said clamp means are open; and means for applying control signals derived by said sampling to a point in said amplifier to correct for drift or slope.

One embodiment of the invention comprises a direct coupled amplifier including a cathode-coupled pair of valves or equivalent devices; means for applying periodic pulse input of a given frequency through a resistance to the input terminal of one of said devices; a storage condenser connected to the input terminal of the other of said devices; a condenser connected between output and input of said amplifier; switch means connected across said condenser; means for opening and closing said switch means at said frequency with each period of opening longer than the period of closing and including the duration of one input pulse and part of the space between two successive input pulses; periodic means for sampling the amplifier output to derive control signals, said periodic means operating at said frequency and being adapted to effect sampling in periods which occur between successive input pulses and in which said switch means are open; and means for applying the derived control signals to said storage condenser. The expression "switch means" is used here in a wide sense to include electronic switch means, i.e. electronic circuit arrangements operatively equivalent to switches. In practice, the switch means would be electronic switch means.

Preferably AZC is also employed in carrying out this invention. Such AZC means may comprise means for sampling the amplifier output at the frequency of the input pulses during periods which precede the ASC sampling periods and occur when the clamp means are closed, and means for applying control signals derived by said sampling to correct the output signals for zero drift. Alternatively the AZC means may comprise means for sampling the amplifier output during a portion of each ASC sampling period to develop control signals and means for applying said control signals to correct the output signals for zero drift.

Conveniently the sampling means may consist, in each case, of pulse-wave attached switch means—a term which again includes electronic switches. Where both ASC and AZC are employed, so that samples of output are taken for both purposes, it is convenient to employ three pulse-wave actuated switch means, one adapted to take output samples over periods each of which includes both an ASC sampling period and an AZC sampling period, and the other two of which divide the sample taken by the first, one of said two switch means feeding one portion of each sample taken by the first switch means to effect ASC and the other of said two switch means feeding another portion of each such sample to effect AZC.

Figure 2:
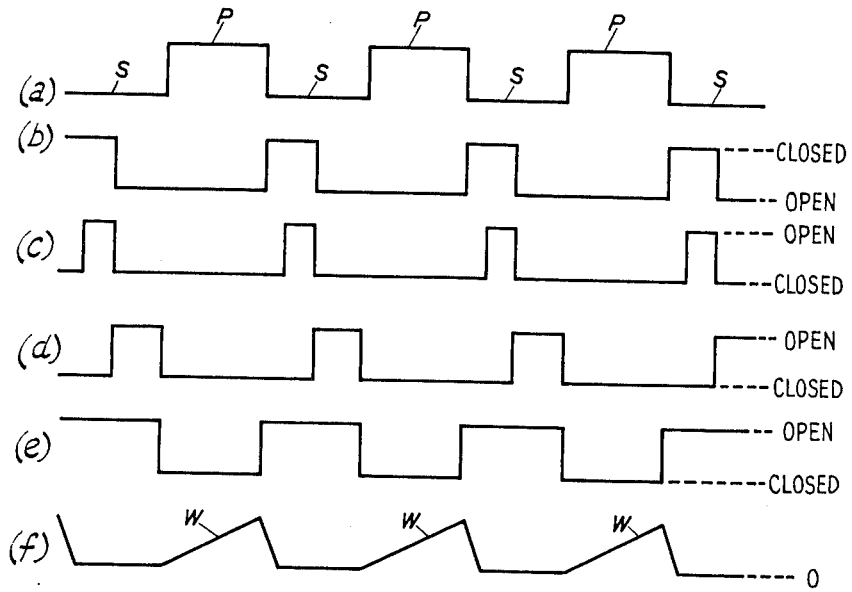
Figure 3:
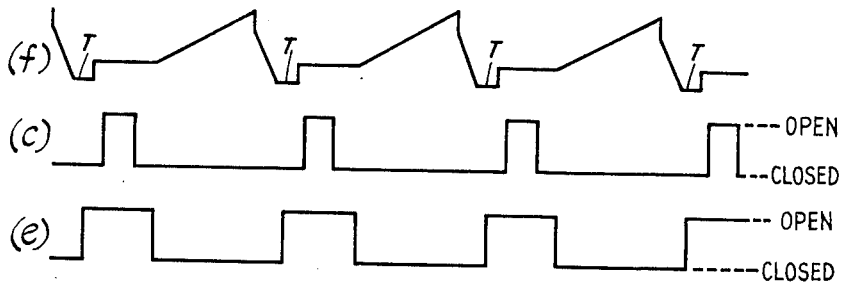

The invention is illustrated in the accompanying drawings in which FIG. 1 is a simplified circuit diagram of one embodiment; FIG. 2 is an explanatory graphical figure relating to the operation of the embodiment of FIG. 1; and FIG. 3 is an explanatory graphical figure relating to the operation of a modification.

Referring to FIGS. 1 and 2, the circuit arrangement within the chain line block A is a direct coupled amplifier having a pair of valves A1 and A2 connected by a common cathode resistor, an amplifier valve A3 and a cathode follower A4. Square pulse-wave input as represented in line (a) of FIG. 2 is applied through resistance A5 to the grid of the valve A1 as indicated by the reference (a) in FIG. 1. Output taken from the cathode of the valve A4 is required to be saw-tooth wave output as represented by line (f) in FIG. 2, each saw-tooth W being required to be of the duration of one of the pulses P in the input waveform; of amplitude representative of the pulse amplitude; and of a slope depending only on said pulse input amplitude. It is also required that each saw-tooth shall commence at the required zero value indicated in line (f) of FIG. 2 by 0.

A storage condenser A6 is connected between the grid of valve A2 and earth. This capacitor serves the same function as capacitor C in FIG. 18.39 of the above mentioned publication entitled "Waveforms." A condenser C is connected between the output and the input of the amplifier (actually between the cathode of valve A4 and the grid of valve A1) and across this condenser is a periodically operated switch represented for simplicity as a relay switch within the chain line block SC, though in practice an electric switch would be used. This switch effects clamping as well known per se, being operated by a pulse waveform as shown in line (b) of FIG. 2 and which is fed over a lead also indicated by the reference (b) from a composite pulse source within the block PS. It will be observed from FIGURE 2 that the periodicity of switching of the clamp switch SC is the same as the input pulse periodicity but that the clamp switch is open for a longer period than it is closed, each opening period commencing during a space S between successive pulses P in the input waveform and closing at the end of a pulse P.

Output from the amplifier A is sampled by means of an ASC–AZC sampling switch which is again shown as a relay though it would in practice be an electronic switch. This switch is within the chain line block ASZC and is operated by a waveform as shown at (e) in FIGURE 2 and fed to it from the source PS over the lead also marked (e). When the switch ASZC is open, output from the amplifier is sampled and fed to an alternating current amplifier AM. It will be observed that the switch ASZC is open during the spaces S of the input waveform. Output from the amplifier AM is taken as an ASC correcting signal to the live side of the condenser A6 in the amplifier A, but a switch, again represented as a relay switch within the block ASC but which would again in practice be an electronic switch, is arranged when closed to earth the lead from the amplifier AM to the condenser A6, which serves to smooth the ASC signal applied to the grid of A2. The switch ASC is actuated by a waveform as shown at (d) in FIGURE 2 and fed to it from the source PS over the lead marked (d). It will be observed that the switch ASC is open only during part of each space S in the input waveform, the termination of each open period coinciding with the commencement of a pulse P.

Output from the amplifier AM is also transformed into a direct current AZC control signal to the output circuit of the amplifier A, the means for producing the direct current control signal from the output of the amplifier AM including the resistances R1 and R2 and the condenser K. The resistances R1 and R2 with the condenser K provide a filtering network for smoothing the signal applied through R1 in a conventional manner. It will be observed that the lead from the amplifier AM to the resistance R2 can be earthed by a further switch within the chain line block AZC and which is again represented as a relay, though it would in practice be an electronic switch. This switch is actuated by a waveform as shown at (c) in FIGURE 2, the pulses of which occur during the spaces S in the input pulses and immediately prior to the pulses in the waveform (d).

It will be seen that with this arrangement sampling for ASC is effected only during the spaces of the input waveform and therefore no input signals are lost in order to effect ASC. Furthermore, since sampling for ASC purposes takes place during each successive space S an enhanced degree of ASC is obtained as compared to an arrangement in which sampling for this purpose is effected at only relatively long intervals. Similarly the AZC control is also good because sampling for this purpose is again effected at frequent intervals, in fact once during each space S.

It is a common experence that a clamping switch such as the switch SC of FIGURE 1, will produce undesired spike-like distortion in the output waveform so that the said waveform will appear somewhat as shown at (f) in FIGURE 3 instead of as at (f) in FIGURE 2. As will be seen, the effect of the "spikes" produced by the switch is to develop downward steps such as the steps T (FIGURE 3) at the end of each "return stroke" of a saw-tooth. With an arrangement as shown in FIGURE 1 and operating as described with reference to FIGURE 2, the AZC samples would be taken during the presence of these steps T and this is, of course, a possible source of error. This defect can be avoided without any appreciable disadvantage by operating the switch AZC of FIGURE 1 rather differently from the manner already described with reference to FIGURE 2. Referring to FIGURE 3 the switch AZC may be operated by a waveform as shown at (c) of FIGURE 3. It will be seen that the pulses in this waveform no longer occur before the pulses for operating the switch ASC (line (d) of FIGURE 2) but actually during those pulses. If the pulse waveform as shown at (c) of FIGURE 3 is used instead of that as shown at (c) of FIGURE 2, the waveform of line (e) of FIGURE 2 will also, of course, have to be modified. A suitable modified form is shown at (e) in FIGURE 3. In this modified way of operating the arrangement of FIGURE 1, the pulse waveform (d) of FIGURE 2 is still used. If desired, what may be termed the composite ASC/AZC pulsed waveform may have its individual pulses commencing a little earlier than previously as, in fact, is indicated in line (e) of FIGURE 3. FIGURES 2 and 3 are drawn to the same time scale so that the time relation of the various waveforms will be apparent, being readable across both figures.

I claim:

1. A periodic integrator including an amplifier, means for applying a periodic pulsed waveform to the input of said amplifier; means in said amplifier for transforming each input pulse into a saw-tooth output wave of amplitude dependent on the input pulse amplitude; periodically actuated clamp means between the output and the input of said amplifier, said clamp means being actuated at the input pulse frequency but having the duration of each period of "opening" longer than the duration of an input pulse so that the clamp is open during each input pulse and also during part of the space between two successive input pulses; means for periodically sampling the amplifier output at the input pulse frequency during periods each of which occurs during the part of a space between successive input pulses when said clamp means are open; and means for applying control signals derived by said sampling to a point in said amplifier to correct for drift of slope.

2. An integrator as claimed in claim 1 wherein there is provided automatic zero correction means including means for sampling the amplifier output at the frequency of the input pulses during periods which precede the automatic slope correction sampling periods and occur when the clamp means are closed, and means for applying control signals derived by the last mentioned sampling to correct the output signals for zero drift.

3. An integrator as defined in claim 1 wherein said sampling means consists of pulse actuated switch means.

4. An integrator defined in claim 1 wherein both automatic slope correction and automatic zero correction are employed, so that samples of output are taken for both purposes and wherein the sampling means comprise three pulse-wave actuated switch means, one adapted to take output samples over periods each of which includes both an automatic slope correction sampling period and an automatic zero correction sampling period, and the other two of which divide the samples taken by the first, one of said other two switch means feeding one portion of each sample taken by the first switch means to effect automatic slope correction and the other of said two switch means feeding another portion of each such sample to effect automatic zero correction.

5. An integrator as claimed in claim 1 wherein there is provided automatic zero correction means including means for sampling the amplifier output during a portion of each automatic slope correction sampling period to develop control signals and means for applying said control signals to correct the output signals for zero drift.

6. A periodic integrator including a direct coupled amplifier including cathode-coupled pair of valves; means for applying periodic pulse input of a given frequency through a resistance to the input terminal of one of said valves; a storage condenser connected to the input terminal of the other of said valves; a further condenser connected between output and input of said amplifier; switch means connected across said further condenser; means for opening and closing said switch means at said frequency with each period of opening longer than the period of closing and including the duration of one input pulse and part of the space between two successive input pulses; periodic means for sampling the amplifier output to derive control signals, said periodic means operating at said frequency and being adapted to effect sampling in periods which occur between successive input pulses and in which said switch means are open; and means for applying the derived control signals to said storage condenser.

References Cited by the Examiner

UNITED STATES PATENTS

| 2,715,182 | 8/55 | Bishop | 328—185 X |
| 2,741,668 | 4/56 | Iffland | 330—9 |
| 2,750,110 | 6/56 | Och | 235—183 |
| 2,980,866 | 4/61 | Naines | 328—35 X |

ARTHUR GAUSS, *Primary Examiner.*

GEORGE N. WESTBY, *Examiner.*